United States Patent
Steinhauser et al.

(10) Patent No.: US 8,235,866 B2
(45) Date of Patent: *Aug. 7, 2012

(54) METHOD FOR ACTUATING A GEAR STEP IN AN AUTOMATIC OR AUTOMATED TRANSMISSION OF A MOTOR VEHICLE AND CORRESPONDING MOTOR VEHICLE

(75) Inventors: Klaus Steinhauser, Kressbronn (DE); Frank Worms, Langenargen (DE); Stephane Klein, Friedrichshafen (DE); Walter Hecht, Ravensburg (DE); Bernd Zaenglein, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 348 days.

This patent is subject to a terminal disclaimer.

(21) Appl. No.: 12/669,589

(22) PCT Filed: Jul. 3, 2008

(86) PCT No.: PCT/EP2008/058575
§ 371 (c)(1),
(2), (4) Date: Jan. 19, 2010

(87) PCT Pub. No.: WO2009/010395
PCT Pub. Date: Jan. 22, 2009

(65) Prior Publication Data
US 2010/0197456 A1    Aug. 5, 2010

(30) Foreign Application Priority Data

Jul. 19, 2007 (DE) .......................... 10 2007 033 583
Aug. 29, 2007 (DE) .......................... 10 2007 040 671

(51) Int. Cl.
*B60W 10/00* (2006.01)
(52) U.S. Cl. ......................................................... 477/96
(58) Field of Classification Search .................... None
See application file for complete search history.

(56) References Cited

U.S. PATENT DOCUMENTS 3,937,105 A    2/1976 Arai et al.
(Continued)

FOREIGN PATENT DOCUMENTS

DE    41 27 991 A1    2/1993
(Continued)

*Primary Examiner* — Dirk Wright
(74) *Attorney, Agent, or Firm* — Davis & Bujold, P.L.L.C.

(57) ABSTRACT

A method of actuating a gear step in an automatic or automated transmission of a motor vehicle. The gear step of the transmission and a parking lock, which immobilizes the vehicle, can be engaged as a function of a gear step (P, R, N, D) that can be selected by the driver via a controllable selector device, and as a function of other motor vehicle operating parameters. A separate operating device, which is in addition to the selector device, can activate a holding phase, in which the transmission is in a traction-free neutral position, independently of a predetermined gear step "Park" (P), "Reverse" (R), "Neutral" (N) and/or "Forward" (D) that is specified by the selector device, if the motor vehicle is at least almost at a standstill and at the same time, an ignition circuit acting on a drive motor of the motor vehicle is electrically interrupted.

34 Claims, 1 Drawing Sheet

U.S. PATENT DOCUMENTS

| | | | |
|---|---|---|---|
| 4,558,612 A | 12/1985 | Shimizu et al. | |
| 4,892,014 A | 1/1990 | Morell et al. | |
| 5,919,112 A | 7/1999 | Michael et al. | |
| 6,802,574 B2 | 10/2004 | Ehrmaier et al. | |
| 7,064,525 B2 * | 6/2006 | Pachciarz et al. | 322/28 |
| 7,204,785 B2 | 4/2007 | Berger et al. | |
| 8,062,177 B2 * | 11/2011 | Hecht et al. | 477/96 |
| 8,128,530 B2 * | 3/2012 | Hecht et al. | 477/92 |

FOREIGN PATENT DOCUMENTS

| | | |
|---|---|---|
| DE | 100 37 576 A1 | 2/2002 |
| DE | 103 20 280 A1 | 11/2003 |
| EP | 0 814 287 A2 | 12/1997 |
| EP | 1 191 260 A2 | 3/2002 |
| JP | 2003-080967 A | 3/2003 |

* cited by examiner

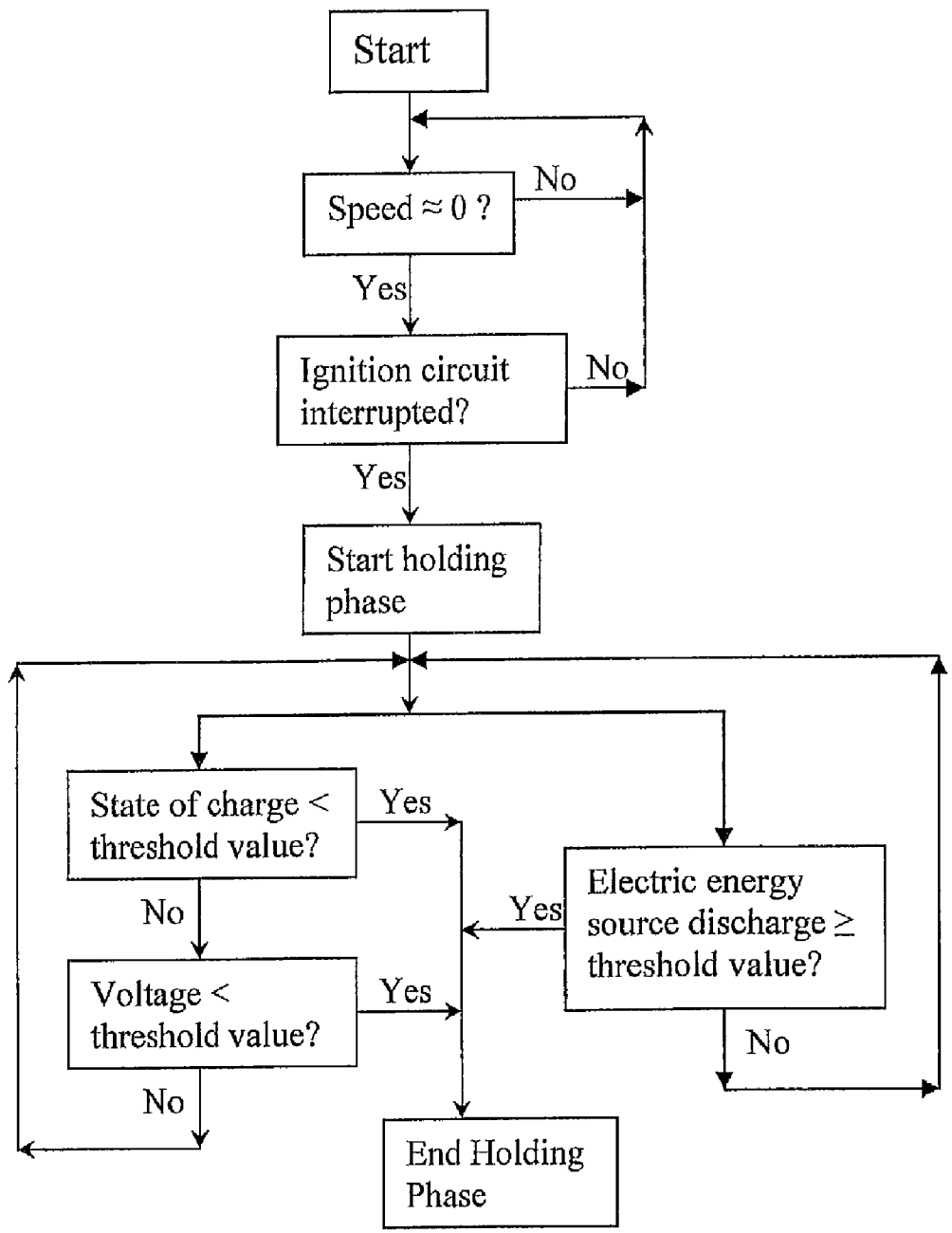

METHOD FOR ACTUATING A GEAR STEP IN AN AUTOMATIC OR AUTOMATED TRANSMISSION OF A MOTOR VEHICLE AND CORRESPONDING MOTOR VEHICLE

This application is a National Stage completion of PCT/EP2008/058575 filed Jul. 3, 2008, which claims priority from German patent application nos. 10 2007 033 583.2 and 10 2007 040 671.3, filed Jul. 19, 2007 and Aug. 29, 2007 respectively.

FIELD OF THE INVENTION

The invention relates to a method for actuating a gear step in an automatic or automated transmission of a motor vehicle, wherein the gear step of the transmission and a parking lock, provided for immobilizing the vehicle, can be selected as a function of a gear step (P, R, N, D) selected by the driver of the vehicle via a controllable selector device, and as a function of other operating parameters of the motor vehicle. The invention also relates to a motor vehicle operated using this method.

BACKGROUND OF THE INVENTION

Known automatic or automated motor vehicle transmissions generally have a parking lock, with which an output shaft of the transmission can be mechanically fixed. In addition to a purely mechanical system for actuating such parking locks via a mechanical functional connection between a selector lever that is operated by the driver in the interior of the motor vehicle and the parking lock in the transmission, electromechanical and electrohydraulic systems for actuating such parking locks are also known—for example from DE 4127991 C2—wherein the parking lock in the transmission is connected via an electrical functional connection to a selector device operated by the driver in the interior of the motor vehicle, and systems in which the parking lock is electromechanically, or, as the case may be, electrohydraulically actuated by means of a parking lock function implemented in an electronic control device of the transmission as a function of other operating parameters of the motor vehicle.

In addition, various methods of automatically engaging such parking locks are known. For example, U.S. Pat. No. 3,937,105 proposes automatically engaging the parking lock of the transmission, independently of the gear step selected by the driver, if an ignition circuit of the motor vehicle is interrupted, and at the same time, the motor vehicle is still coasting at a lower speed than a defined low threshold value.

From U.S. Pat. No. 4,892,014, a method is known according to which the parking lock of the transmission is automatically electromotorically engaged, on the one hand, when an ignition circuit of the motor vehicle is interrupted, and at the same time the speed of the motor vehicle is lower than a predefined low threshold value, and on the other hand, also when the driver's door of the motor vehicle is open, and at the same time, there is no weight on the driver's seat of the motor vehicle, and at the same time the speed of the motor vehicle is lower than the above mentioned low threshold value. In both cases, it is provided that when the parking lock is automatically engaged, a parking lock of the motor vehicle is also automatically actuated. U.S. Pat. No. 4,892,014 also proposes that when the ignition circuit is closed, but the drive motor of the motor vehicle is not operating, the transmission automatically shifts electromotorically into its neutral position, without the need for a request of such an action by the driver.

Finally, from EP 0 814 287 61, a function for automatically engaging the parking lock of an automatic transmission is known, wherein the parking lock in an automatic transmission is automatically engaged by the transmission control device, if the speed of the motor vehicle is zero, and at the same time the ignition circuit is interrupted, and at the same time, as an additional condition, a predefined period of time has passed since the interruption of the ignition circuit, or a vehicle door is opened, however, not later—as the only condition—than when the ignition key is removed from the ignition lock. In order to achieve a better vehicle availability, as a special feature in all three cases, the actuation of the parking lock is prevented when, immediately before switching off the engine or within a predefined period of time after switching off the engine, the driver has selected the gear step 'neutral' with the selector lever.

SUMMARY OF THE INVENTION

The object underlying the present invention is to specify an alternative method of actuating a gear step in an automatic or automated transmission of a motor vehicle, wherein the gear step in the transmission and a parking lock provided for immobilizing the motor vehicle is engaged as a function of a gear step selected by the driver of the motor vehicle by means of a selector device, and as a function of other operating parameters of the motor vehicle, and wherein, in operating states in which automatic engagement of the parking lock is provided according to known, particular operating parameters of the motor vehicle, and/or the engagement of the parking lock is system-dependently possible, the drivability, or, as the case may be, maneuverability of the motor vehicle is as high as possible.

The invention is based on a method of actuating a gear step in an automatic or automated transmission of a motor vehicle, wherein the gear step of the transmission and a parking lock provided for immobilizing the motor vehicle can be actuated as a function of a gear step (P, R, N, D) selected at a gear selector device operated by the driver of the motor vehicle, and as a function of other operating parameters of the motor vehicle.

According to the present invention, it is proposed that by means of a separate operating device provided in addition to the selector device, a holding phase can be activated independently of a gear step "Park" (P), "Reverse" (R), "Neutral" (N) and/or "Forward" (D), in which the transmission is in a traction-free neutral position, when the motor vehicle is at least almost at a standstill and at the same time, an ignition circuit that acts on a drive engine of the motor vehicle is interrupted.

In this way, the driver is able to deliberately, quickly, and with simple operating means put the motor vehicle into an operating state in which the motor vehicle can coast, despite the drive motor being stopped, without the driver having to pay attention to the current position of the selector device provided for selecting the gear step (P, R, N, D). This is useful, for example, when the driver of the motor vehicle is standing in front of a car wash facility and has switched off the drive motor via the ignition circuit that acts on the drive motor, and the transmission of the motor vehicle would, unless additional measures were taken, system-dependently automatically engage the parking lock, for example because there would no longer be any oil pressure in the transmission because the oil pump is no longer functioning.

Additional criteria, or, as the case may be, framework conditions might also be provided, which also have to be met in order to activate the holding phase in which the transmission is in a traction-free neutral state. It may, for example, be provided that in addition to the already mentioned three framework conditions: "the motor vehicle is at least almost at a standstill," "the ignition circuit acting on the drive motor is electrically interrupted," and "the drive step "Neutral" (N) has been selected" that have to be simultaneously met to even enable the activation by means of the separate operating device of the holding phase in which the transmission is in a traction-free neutral position, an additional condition "the motor vehicle is in an at least almost horizontal position," has to be simultaneously met in order to activate the holding phase.

It can, for example, also be provided that in addition to the three framework conditions: "the motor vehicle is at least almost at a standstill," "the ignition circuit acting on the drive motor is electrically interrupted," and "the drive step "Neutral" (N) has been selected" that have to be simultaneously met to even enable activation by means of the separate operating device of the holding phase in which the transmission is in a traction-free neutral position, an additional condition in order to activate the holding phase: "the ignition key has not been removed from a mechanical or electromechanical ignition lock assigned to it, or is not outside a defined zone surrounding an electronic ignition lock that is assigned to the ignition key" has to be simultaneously met.

All of the above mentioned framework conditions can also be combined in a useful way. It can be provided, for example, that the holding phase can only be activated WHEN the motor vehicle is in an at least an almost horizontal position AND at the same time, a determined current speed of the motor vehicle is lower than a predefined low threshold value, AND at the same time, an ignition key has not been removed from a mechanical or electromechanical ignition lock assigned to the ignition key, or is not outside a defined zone around an electronic ignition lock that is assigned to the ignition key. Therefore, three individual functions, each with their own functional logic via Boolean AND-operators, are in this case combined to form one complex overall function.

In addition, or alternatively, it can also be provided that the holding phase can only be activated upon detection that the driver does not intend to get out of the motor vehicle or is not getting out of the vehicle. This intention on the part of the driver can be assumed if at least one or a plurality of the following criteria is met:
  "a driver's door of the motor vehicle is open"
  "a driver's safety belt is not fastened"
  "a driver's seat occupancy detection device reports an unoccupied driver's seat"
where it is useful to logically combine at least two of these criteria by means of a "logical AND".

As a result, high availability is achieved by the logical combination of those individual functions via a "logical AND", and at the same time, a high safety level for the vehicle occupants and the environment against the motor vehicle rolling away unintentionally.

In order to achieve a high level of security against unintentional removal of the ignition key, it can also be provided that when the holding phase is or has been activated, an ignition-key lock—also known as a so-called "key lock"—is activated or has been activated, which prevents the mechanical ignition key from being removed from its mechanical, or, as the case may be, electromechanical ignition lock, or that the electronic ignition key—for example in the manner of a so-called "ID card"—is taken too far away from its electronic ignition lock.

Furthermore, it is also useful if, when the holding phase is or has been activated, an acoustic and/or optical indicator is or has been activated. In this way, the driver is reminded that he has performed a manual operation, or, as the case may be, that an operation has been performed affecting the immobilization of the vehicle, and that the motor vehicle can therefore move.

With regard to deactivating the previously activated holding phase, in which the transmission is in a traction-free neutral position, two variants are proposed. In the first of the two variants, it is proposed that the driver may manually deactivate the previously activated holding phase by means of the separate operating device.

In this case, it is useful if the parking lock is engaged and/or a parking brake on the vehicle side is automatically actuated when the previously activated holding phase is manually ended, independently of the gear step selected by means of the selector device, particularly if the driver is not inside the motor vehicle. Alternatively, it can be provided that when the previously activated holding phase is manually ended, the gear step selected by means of a selector device is engaged, if it is system-dependently possible.

The second variant proposes that the previously activated holding phase may be automatically deactivated. Important aspects hereto are the operational safety and the reliability of the system.

Correspondingly, in order to achieve a higher level of security with changing operational parameters, it is proposed that the previously activated holding phase is automatically ended, when the current speed of the motor vehicle is higher than a predefined speed threshold. This ensures that the motor vehicle can only move within defined limits. This predefined speed threshold can also be higher than the predefined low threshold value of the vehicle speed which should not be exceeded during activation of the holding phase.

In order to increase the level of security by changing operational parameters, it can also be provided that the previously activated holding phase is automatically ended, when the motor vehicle is not in an at least almost horizontal position.

In order to increase the level of security against inattention on the part of the driver and improper use, it is proposed that the previously activated holding phase is automatically ended, when the ignition key is removed from its mechanical, or, as the case may be, electromechanical ignition lock, or is outside a defined zone around its electronic ignition lock.

In order to increase the level of security against inattention on the part of the driver, it can also be provided that the previously activated holding phase is automatically ended upon detection that the driver intends to get out of the motor vehicle or is in the process of doing so. As already mentioned above, it can be assumed that this intention or action on the part of the driver exists, if one or more of the following criteria are met:
  "a driver's door of the motor vehicle is open"
  "a driver's safety belt is not fastened"
  "a driver's seat occupancy detection device reports an unoccupied driver's seat."

In order to increase the level of security against inattention on the part of the driver, it can also be provided that the previously activated holding phase is automatically ended, when a predefined timer stage has run out. This function also has the great advantage that the method according to the present invention does not overload the electric system of the motor vehicle. In this context, reference is made to the conventional structure of transmissions with an electrohydraulically actuated parking lock system, in which the parking lock is released by means of hydraulic pressure, kept in a released state by means of an electrically charged electromagnet, and disengaged when there is no hydraulic pressure and an electromagnet is switched off electrically by means of spring force. Particularly in connection with such a transmission, the proposed, relatively simple functional add-on can prevent the motor vehicle battery from being excessively discharged by the electrical load, particularly by that of the transmission control device. In a practical manner, the above mentioned timer stage starts when the command to activate the holding phase is detected, or not later than when the transmission is actually in a neutral position.

Monitoring the current state of the electrical charge or the current voltage of the motor vehicle battery provides an even more efficient protection of the motor vehicle battery against excessive discharge. Correspondingly, it is proposed, in an additional variant, that the previously activated holding phase is automatically ended, when the current state of charge and/or the current voltage of the electrical energy source of the motor vehicle, which is provided to supply the control device of the transmission and/or to start the drive motor, has dropped to a value below a predefined discharge threshold.

The most efficient protection for the motor vehicle battery against excessive discharge is obtained by monitoring the amount of energy which may be discharged within the function of the motor vehicle battery, or, as the case may be, from the electrical energy source of the motor vehicle provided to supply the transmission control device and/or to start the drive motor, in particular from the transmission control device. Such an amount of energy can, for example, be calculated in a relatively simple manner by integrating the current power consumption of the transmission control device with time, or by integrating the mathematical product of the actually current operating voltage and the actually current power consumption of the transmission control device with time. Correspondingly, it is proposed, in another variant, that the previously activated holding phase is automatically ended, when the amount of energy discharged within the function of the motor vehicle battery according to the present invention, or, as the case may be, of the source of electrical energy of the motor vehicle provided to supply the transmission control device and/or for starting the drive motor, reaches a predefined threshold value, or has exceeded it.

Furthermore, it is proposed, for safety reasons, that whenever the previously activated holding phase is automatically ended, the parking lock is automatically engaged and/or a parking brake of the motor vehicle is automatically actuated, independently of the gear step selected by means of the selector device. This reliably prevents the transmission from being inadvertently put in a switching position that would lead to immediate traction in the transmission if the engine were started.

If required, the person skilled in the art will be able to combine the proposed embodiments for automatic deactivation of the holding phase in a practical way, and, if required, he will also be able to combine them with the embodiments for manual deactivation of the holding phase.

In order to provide additional comfort, in a further development of the invention it is proposed that other units of the motor vehicle can be actuated by means of the separate operating device provided for activating the holding phase. It can be provided, for example, that by means of this separate operating device, a command can also be given to close an electrically actuated sun roof or an electromotorically or electrohydraulically actuated folding or collapsible roof, and/or electromotorically actuated windows of the motor vehicle at the same time, or shortly after the activation of the holding phase.

BRIEF DESCRIPTION OF THE DRAWINGS

The invention will now be described, by way of example, with reference to the accompanying sole figure of drawing which is a diagrammatic representation of the various elements of the present invention.

DETAILED DESCRIPTION OF THE PREFERRED EMBODIMENTS

Further embodiments of the method according to the present invention will be explained in more detail hereinafter with reference to special embodiments of the separate operating device that is provided with a traction-free neutral position in the transmission for at least activating the holding phase.

It can thus be provided, for example, that the separate operating device for activating and deactivating the holding phase is configured as a switch that can be operated by the driver. Correspondingly, the holding phase, in which the transmission is in a traction-free neutral position, can then be activated and/or deactivated by the driver via manual operation of the switch. The design and spatial arrangement of such a switch in the interior of the motor vehicle are arbitrary and at the discretion of the person skilled in the art. An exemplary embodiment thereof is an electromechanical switch, which is integrated in the ignition lock, for example in such a way that the holding phase is activated when the ignition circuit is electrically interrupted by means of an ignition lock. As another exemplary embodiment, an electromechanical switch should be mentioned, which is configured as part of a selector device, or, as the case may be, integrated in the selector device.

However it can also be provided, for example, that the separate operating device for activating and deactivating the holding phase is configured as a remote control switch that is operated from outside the motor vehicle. Correspondingly, the holding phase in which the transmission is in a traction-free neutral position can then be activated and/or deactivated by actuating this remote control switch from outside the motor vehicle. Particularly relevant in this instance are systems that have a transmitter (stationery or mobile) outside the motor vehicle, in order to be able to specifically act on the maneuverability of the motor vehicle from outside the vehicle, for example with a transmitter at the entrance of a car wash facility, or a transmitter in a workshop.

In addition, it can for example also be provided that the separate operating device for activating and deactivating the holding phase is configured as a sensor that interprets signals in the proximity of the motor vehicle. Correspondingly, the holding phase in which the transmission is in a traction-free neutral position is then activated and/or deactivated via this sensor. In this context, sensors for detecting images are particularly relevant, by means of which, for example, signs, or the entrance to a car wash facility or a railroad crossing can be appropriately detected consistent with pattern recognition for predefined environmental conditions in which the drive position selected by the selector device does not necessarily have top priority in determining what gear step should actually be engaged in the transmission.

If required, the person skilled in the art will sensibly combine the three above mentioned selector variations: "switch operated by driver," "remote controlled switch," and "sensor."

In principle, the method according to the present invention is also suitable for controlling a parking lock of any design. Normally, the parking lock of an automatic or automated transmission is integrated in the actual transmission.

Normally the mechanically, hydraulically, pneumatically, electrically, hydraulically-mechanically, pneumatically-mechanically, electromechanically, electrohydraulically, or electropneumatically operating control system of the parking lock in known transmissions is integrated in the transmission or arranged directly outside at the transmission. In the case of a control system of the parking lock that operates electromechanically, electrohydraulically or electropneumatically, the actuator that acts on the parking lock is normally actuated by a transmission control device. It is thus practical to integrate all the control functions that are required to implement the command to activate and then deactivate the holding phase according to the present invention with a traction-free neutral position of the transmission in the transmission control device, so that the transmission control device initiates the engagement of the neutral position in the transmission by activating the holding phase and the engagement of the parking brake on the transmission side during deactivation of the holding phase according to the present invention.

In principle, a separate operating device can, however, also be provided for this purpose, the device then communicating in a suitable manner with the transmission and the transmission control device thereof. In any case, suitable communication is required between the separate operating device and the transmission, or, as the case may be, the transmission control device. It can be provided, for example, that the engagement of the neutral position in the transmission is initiated by a control device of the separate operating device when the holding phase is activated, as well as when the parking lock on the transmission side is engaged and/or the parking brake on the motor vehicle side is actuated during deactivation of the holding phase.

In principle, the method according to the present invention is also suitable for controlling a parking brake of any design. Normally, a parking brake is an integral component of a service brake system on the vehicle side, and is operated mechanically or electrohydraulically by the driver, and can also be actuated by a brake control unit if it is available. Autarkic systems, i.e. systems that are independent of the service brake of the motor vehicle, are, however, also known. In any case, in connection with controlling a parking brake on the vehicle side in the context of the invention, suitable communication is required between the separate control system and the other two components involved: parking brake and transmission, or, as the case may be, brake system and transmission control device.

The motor vehicle according to the present invention has an automatic or automated transmission, a selector device that can be operated by the driver of the motor vehicle for selecting a gear step (P, R, N, D) of the transmission, a parking lock on the transmission side and/or a parking brake on the vehicle side, a control device for actuating the transmission and/or parking brake as a function of the gear step (P, R, N, D) selected at the selector device and as a function of other operating parameters or the motor vehicle, as well as an additional separate operating device for manually predefining a holding phase in which the transmission is in a traction-free neutral position, and the motor vehicle is operated by means of the previously described method according to the present invention.

The invention claimed is:

1. A method of actuating a gear step in either an automatic or automated transmission of a motor vehicle, wherein the gear step of the transmission and a parking lock, which is provided for immobilizing the vehicle, are engaged as a function of a gear step (P, R, N, D) selected by a selector device that is operated by a driver of the vehicle, and as a function of other operating parameters of the motor vehicle, and by means of a separate operating device, provided in addition to the selector device, a holding phase is activated independently of at least one of a gear step (P, R, N, D), in which holding phase the transmission is in a traction-free neutral position, if the motor vehicle is at least almost at a standstill and, at the same time, an ignition circuit that acts on a drive engine of the motor vehicle is electrically interrupted, the method comprising the steps of:

automatically deactivating and ending any previously activated holding phase, if at least one of a current state of charge and a current electrical voltage of an electrical energy source of the motor vehicle, which at least one of supplies electrical power to a transmission control device and starts the drive engine, has a lower value than a predefined discharge threshold value.

2. The method according to claim 1, further comprising the step of only activating the holding phase when the motor vehicle is in an at least almost a horizontal position.

3. The method according to claim 1, further comprising the step of only activating the holding phase when either an ignition key has not been removed from one of a mechanical and electromechanical ignition lock, which is assigned to the ignition key, or the ignition key is not outside a defined zone around an electronic ignition lock of the motor vehicle which is assigned to the ignition key.

4. The method according to claim 1, further comprising the step of only activating the holding phase upon detection that the driver either does not intend to exit the motor vehicle or is not in the process of exiting the motor vehicle.

5. The method according to claim 1, further comprising the step of only activating the holding phase, when a determined current speed of the motor vehicle is lower than a predefined low threshold value.

6. The method according to claim 1, further comprising the step of manually deactivating the previously activated holding phase by driver manipulation of the separate operating device.

7. The method according to claim 1, further comprising the step of, when the previously activated holding phase is manually ended, at least one of automatically engaging the parking lock and automatically actuating a parking brake on a vehicle side independently of the gear step (P, R, N, D) that is selected with the selector device.

8. The method according to claim 1, further comprising the step of, when the previously activated holding phase is manually ended, automatically engaging the gear step (P, R, N, D) that is selected with the selector device, if system-dependently possible.

9. The method according to claim 1, further comprising the step of automatically ending the previously activate holding phase when an ignition key is either removed from one of its mechanical and electromechanical ignition lock, and is outside a defined zone around its electronic ignition lock.

10. The method according to claim 1, further comprising the step of automatically ending the previously activated holding phase when a current speed of the motor vehicle is greater than a predefined speed threshold.

11. The method according to claim 10, further comprising the step of defining the predefined speed threshold as being higher than the predefined low threshold value of the speed that should not have been exceeded during activation of the holding phase.

12. The method according to claim 1, further comprising the step of, when the motor vehicle is not in an at least almost horizontal position, automatically ending the previously activated holding phase.

13. The method according to claim 1, further comprising the step of, upon detection that the driver of the motor vehicle either intends to exit the vehicle or is in the process of exiting the vehicle, automatically ending the previously activated holding phase.

14. The method according to claim 1, further comprising the step of, when a predefined timer stage runs out, automatically ending the previously activated holding phase.

15. The method according to claim 1, further comprising the step of at least one of automatically ending the previously activated holding phase, automatically engaging the parking lock, and automatically actuating a parking brake in the motor vehicle, independently of the gear step (P, R, N, D) that is selected with the selector device.

16. The method according to claim 1, further comprising the step of controlling other units of the motor vehicle with the separate operating device which activates the holding phase.

17. The method according to claim 16, further comprising the step of giving a command, either simultaneously with or shortly after activation of the holding phase, to close at least one of an electromotorically operated sliding roof, an electromotorically operated folding collapsible roof, electrohydraulically operated folding collapsible roof, and electrically operated windows of the motor vehicle.

18. The method according to claim 1, further comprising the step of at least one of activating and deactivating the holding phase by manual operation of a switch by the driver.

19. The method according to claim 18, further comprising the step of activating the holding phase by electrically interrupting the ignition circuit by the ignition lock with the switch for activating and deactivating the holding phase integrated in the ignition lock.

20. The method according to claim 1, further comprising the step of at least one of activating and deactivating by operating a remote controlled switch from outside the vehicle.

21. The method according to claim 1, further comprising the step of at least one of activating and deactivating by a sensor that interprets signals in the proximity of the vehicle.

22. The method according to claim 1, further comprising the step of activating a key lock, either approximately simultaneously with activation or after activation of the holding phase, to prevent removal of an ignition key from either its mechanical or electromechanical ignition lock, or removal of an electronic ignition key (ID card) too far away from its electronic ignition lock.

23. The method according to claim 1, further comprising the step of at least one of triggering an acoustic indicator and displaying an optical indicator either approximately simultaneously with activation or after activation of the holding phase.

24. The method according to claim 4, further comprising the step of concluding that the driver either does not intend to exit the motor vehicle or is not in the process of exiting the motor vehicle when at least one of:
    a driver's door of the motor vehicle is open;
    a driver's safety belt is not fastened; and
    a driver's seat occupancy detection device reports an unoccupied driver's seat.

25. The method according to claim 1, further comprising the step of initiating, with a transmission control device, at least one of:
    engagement of a neutral position in the transmission upon activation of the holding phase, engagement of the parking lock on a transmission side; and
    actuation of the parking brake on the vehicle side upon deactivation of the holding phase.

26. The method according to claim 1, further comprising the step of at least one of:
    initiating engagement of a neutral position in the transmission upon activation of the holding phase; and
    initiating at least one of the parking lock on transmission side and actuation of the parking brake on the vehicle side upon deactivation of the holding phase by a control device of the separate operating device of the motor vehicle.

27. A method of actuating a gear step in one of an automatic and an automated transmission of a motor vehicle, wherein the gear step of the transmission and a parking lock, which immobilizes the motor vehicle, are actuated as a function of a gear step (P, R, N, D) that is selected by a driver with a selector device, and as a function of other operational parameters of the motor vehicle, and by means of a separate operating device, which is provided in addition to the selector device, and independently of the gear step (P, R, N, D) that is selected with the selector device, a holding phase in which the transmission is in a traction-free neutral position is activated if the motor vehicle is at least almost at a standstill and, at the same time, an ignition circuit, which acts on drive motor of the motor vehicle, is electrically interrupted, the method comprising the steps of:
    automatically deactivating and ending any previously activated holding phase, if an electrical energy source of the motor vehicle, which at least one of supplies electrical energy to a control device of the transmission and starts the drive motor, has discharged an amount of electrical energy that is at least equal to or greater than a predefined threshold value.

28. The method according to claim 27, further comprising the step of determining the amount of electrical energy by one of a mathematical integration of actual power consumption of the control device over time and a mathematical integration of the product of an actual operating voltage and an actual power consumption of the control device over time.

29. A motor vehicle having an automatic or automated transmission comprising:
    a selector device, which is operated by a driver of the motor vehicle, for selecting a gear step (P, R, N, D) of the transmission;
    at least one of a parking lock on a transmission side and a parking brake on a vehicle side;
    a control device for controlling at least one of the transmission and the parking brake as a function of the gear step (P, R, N, D) and as a function of other operating parameters of the motor vehicle; and
    an additional separate operating device for predefining a holding phase in which the transmission is in a traction-free neutral position;
        the gear step of the transmission and the parking lock, which is provided for immobilizing the vehicle, are engaged as a function of the gear step (P, R, N, D) selected by operation of the selector device by the driver of the vehicle, and as a function of the other operating parameters of the motor vehicle, the additional separate operating device activates the holding phase independently of the gear step (P, R, N, D), in the holding phase the transmission is in the traction-free neutral position, if the motor vehicle is at least almost at a standstill and at the same time, an ignition circuit that acts on a drive engine of the motor vehicle is electrically interrupted, according to a method comprising the steps of:
    automatically deactivating and ending the previously activated holding phase, if at least one of a current state of charge and a current electrical voltage of an electrical energy source of the motor vehicle, which at least one of supplies electrical power to the transmission control device and starts the drive engine, has a lower value than a predefined discharge threshold value.

30. The motor vehicle according to claim 29, wherein the separate operating device for either activating or deactivating the holding phase is a switch that is operated by the driver.

31. The motor vehicle according to claim 30, wherein the switch for either activating and deactivating the holding phase is integrated in the ignition lock.

32. The motor vehicle according to claim 30, wherein the switch is either part of the selector device or integrated in the selector device.

33. The motor vehicle according to claim 29, wherein the separate operating device for either activating and deactivating the holding phase is a remote controlled switch that is operable from outside the vehicle.

34. The motor vehicle according to claim 31, wherein the separate operating device for either activating and deactivating the holding phase is a sensor that interprets signals in a proximity of the vehicle.

* * * * *